United States Patent [19]
Harris et al.

[11] Patent Number: 6,020,813
[45] Date of Patent: Feb. 1, 2000

[54] SELF-CANCELING VEHICLE TURN SIGNAL WITH SAFETY REACTIVATION

[76] Inventors: Carl N. Harris, 2904 Augusta Dr., Durham, N.C. 27707; Dewey F. Harris, 1912 Cannon Dr., Durham, N.C. 27705

[21] Appl. No.: 09/328,518

[22] Filed: Jun. 9, 1999

[51] Int. Cl.⁷ ..................................................... B60Q 1/34
[52] U.S. Cl. ...................... 340/465; 340/475; 340/476; 340/477; 340/309.15; 340/309.6; 200/61.27; 116/37; 362/459; 362/487
[58] Field of Search ................... 340/465, 466, 340/475, 476, 477, 478, 309.15, 309.6; 200/61.27–61.38; 116/35 R, 36, 37; 362/36, 487, 459, 498, 540

[56] References Cited

U.S. PATENT DOCUMENTS

| | | |
|---|---|---|
| 4,058,797 | 11/1977 | Sekiguchi et al. ........................ 340/477 |
| 4,660,020 | 4/1987 | Miyamaru et al. ...................... 340/477 |
| 4,907,844 | 3/1990 | White ....................................... 340/457 |
| 5,049,706 | 9/1991 | Du Rocher ............................. 200/61.54 |
| 5,486,809 | 1/1996 | Wadlington, Jr. ........................ 340/477 |
| 5,663,708 | 9/1997 | Strawn ..................................... 340/465 |
| 5,808,545 | 9/1998 | Brueggemann et al. ............... 340/468 |

*Primary Examiner*—Daryl Pope
*Attorney, Agent, or Firm*—Olive & Olive, P.A.

[57] ABSTRACT

The turn signal system of the invention utilizes a timing circuit to electrically activate and deactivate the flashing turn signal. The invention system also utilizes a pair (left, right) of auxiliary, spring-loaded, momentary contact, normally open switches arranged such that if the driver actuates the turn signal lever for a turn, even though the lever is in the actuated position for that turn, the turn signal flashing circuit is reactivated by the momentary closing of the auxiliary switch and the cycle is restarted. The system of the invention is also characterized by the timing circuit being dependent for its operation on signals received from the vehicle's speed sensor such that the timing circuit will not operate unless there is a signal from the speed sensor to indicate the vehicle is moving.

5 Claims, 1 Drawing Sheet

SELF-CANCELING VEHICLE TURN SIGNAL WITH SAFETY REACTIVATION

BACKGROUND OF THE INVENTION

1. Field of the Invention

This invention relates to hand-operated and electrically energized turn signal systems for indicating left and right turns of a vehicle.

2. Background of the Invention

A serious safety related condition is created on highways and streets whenever a moving vehicle is traveling with a turn signal flashing for a turn even though the driver is not intending to make a turn, and is unaware that his turn signal is flashing. This condition poses particularly dangerous conditions to other vehicles as well as to the driver. The continuously flashing signal in any event offers a high degree of distraction, concern, and irritation to drivers both following and on-coming. Such conditions are frequently observed while driving and can cause serious head-on accidents.

The described condition is more likely nowadays in those vehicles in which the turn signal actuation lever is normally expected to be returned to "off" by the rotational movement of the steering wheel in the direction opposite to the turn so as to normally be automatically mechanically canceling. However, when power and faster steering as provided in modern vehicles are used on improved roads with more gradual turns and exits, there is often not a sufficient movement of the steering wheel to cause the cancellation.

In recent years, some of the newer vehicles have been equipped with an audible signal which is heard by the driver after a fixed interval to alert the driver that the turn signal was actuated. Unfortunately, this audible signal can cause additional safety concerns when its meaning is confused with other audible warnings such as given for engine malfunction. Drivers have reported that the first time the audible system actuated, not recognizing its intended meaning, they immediately cut across traffic lanes to get to the shoulder and stop. Numerous near accidents have been recognized even though available data is not sufficient to determine how many actual accidents the current type of audible system has caused. Further, when high sound levels of music are being listened to while driving, the audible warning signal may become inaudible to the driver.

Speed and mileage odometers and speedometers in modem vehicles utilize signals produced by what is referred to as a speed sensor. In this regard, it is known to use an odometer signal as a means for creating both visual and audible signals to alert the driver of a vehicle after it has been driven for a certain distance with a flashing turn signal. However, none of such systems, so far as is known, cause a turn signal to be canceled after a predetermined time.

Thus, it can be seen that there is a need for an improved vehicle turn signal system which overcomes the described shortcomings of the existing systems and such becomes the primary object of the invention. Other objects will become apparent as the description proceeds.

SUMMARY OF THE INVENTION

The turn signal control system of the invention utilizes electronic circuitry which whenever the vehicle is in motion is used to electrically activate a timed flashing turn signal and then after a period of time deactivate, and thus cancel, the flashing turn signal. The invention system also utilizes a pair (left, right) of auxiliary spring-loaded, momentary contact, normally open switches arranged such that if after the timing cycle has expired for a particular turn and with the vehicle remaining in motion, the driver actuates the turn signal lever for the same kind of turn, even though the lever is already in the actuated position for that turn, the turn signal flashing circuit is reactivated by the momentary closing of the auxiliary switch and the cycle is restarted. As previously mentioned, the system of the invention is also characterized by the timing circuit being dependent for its operation on the vehicle being in motion. For this purpose, activation of the electronic circuitry is made dependent on signals received from the vehicle's speed sensor such that a timing circuit made part of the electronic circuitry will not cause the desired self-canceling of a continuous flashing turn signal according to a time cycle unless there is a signal from the speed sensor to indicate the vehicle is moving at some predetermined speed which can be calibrated. Nevertheless, when the vehicle is not moving, the conventional turn signal system remains operative such that a stationary vehicle can, for example, signal a turn before moving into a lane of traffic.

DETAILED DESCRIPTION OF PREFERRED EMBODIMENT OF THE INVENTION

Figure 1:
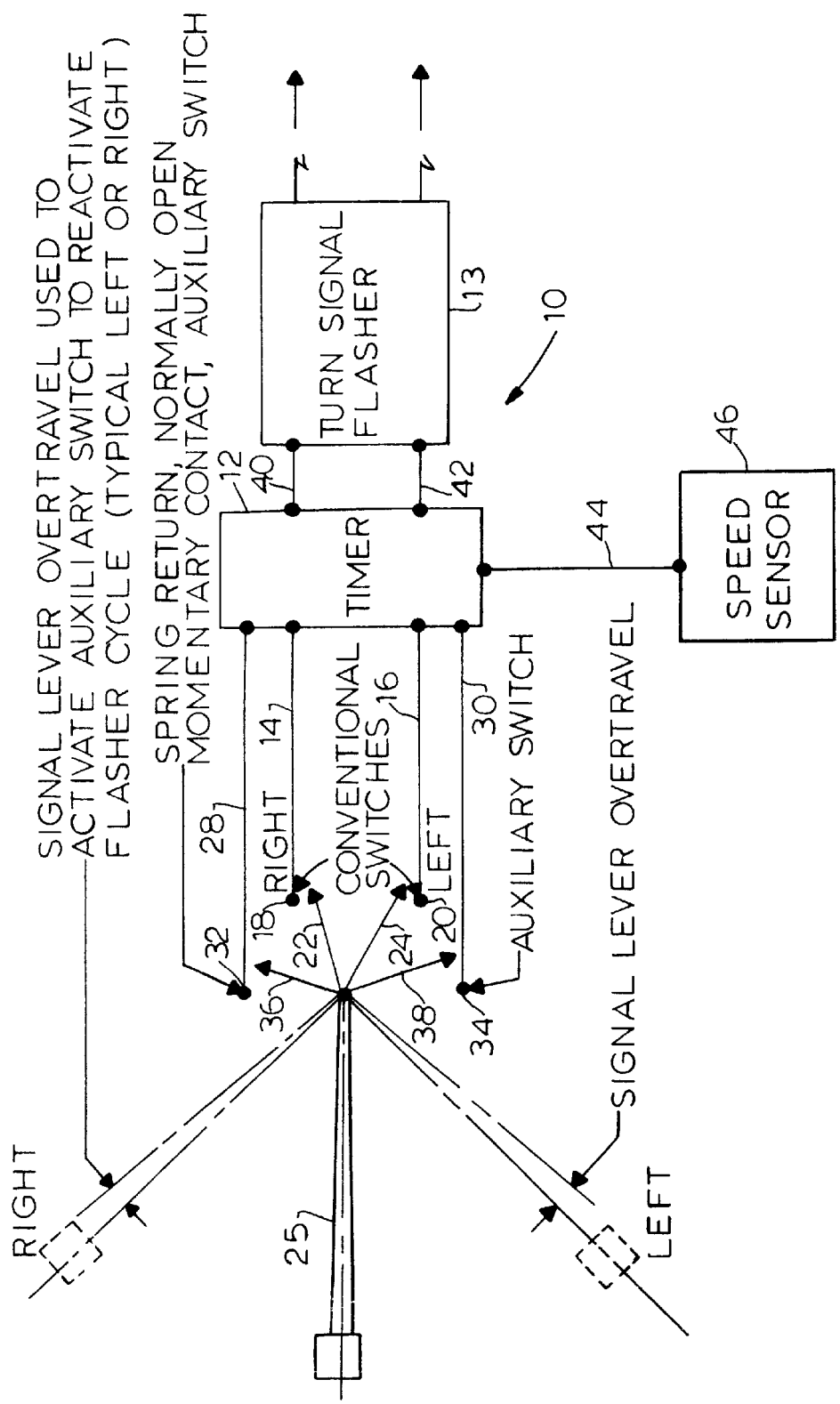
FIG. 1 illustrates, in schematic form, the circuitry of the invention system.

The invention system utilizes readily available technology and related components which can be added to the existing mechanically actuated and canceling turn signal system. That is an existing mechanically actuated and canceling turn signal system can remain in place when a system according to the invention is added to the vehicle either as a retrofit or as part of the vehicle's original equipment. Since the specific mechanical and electrical details of turn signal systems are well known and will vary substantially from one type of vehicle to the other, the invention is illustrated and described somewhat schematically from which those skilled in the art will readily understand how the invention can be applied to a specific kind of vehicle and its specific kind of turn signal system.

Making reference to FIG. 1, the system 10 of the invention utilizes a timer 12 having a conventional adjustable timing circuit, not shown, through which signals are passed and timed to activate and deactivate a turn signal flasher 13. The timing circuit of timer 12 is connected on its input side through lines 14, 16 to conventional switches 18, 20 operated by schematically illustrated contact arms 22, 24 positioned by the typically pivotably mounted signal lever 25. The timing circuit of timer 12 is also connected on its input side through lines 28, 30 to a pair of auxiliary, normally open, momentary contact, spring return switches 32, 34 operated by schematically illustrated contact arms 36, 38, respectively. The timing circuit of timer 12 is also connected on its output side through lines 40, 42 to the turn signal flasher 13. Here, the invention recognizes that while turn signal switches such as switches 32, 34 have long been activated by a turn signal lever mounted on the vehicle's steering column, such switches could also be activated by manual pushing of switches located on a steering wheel or elsewhere.

As shown in FIG. 1, the conventional speed sensor 46 of the vehicle whose electric signals are typically used to indicate speed is for purpose of the system 10 of the invention, connected to timer 12 and used specifically for the purpose of controlling when the timing circuit of timer 12 is made operable and active for passing and timing signals transmitted between right signal input lines 28, 14, and right signal output line 40 and between left signal input lines 16, 30 and left signal output line 42. That is, timer 12 is appropriately wired so as to include appropriate operatively associated switching means, not shown, controlled by signals from speed sensor 46 which places the timing circuit of timer 12 in operation whenever the vehicle is in motion so as to both pass and time signals received and transmitted between the input and output terminals of timer 12. Timer 12 is also appropriately wired and fitted with switching means, not shown, which enable signals received on the input side of timer 12 to effectively bypass the timing circuitry and be transmitted to the output lines 40, 42 when the vehicle is not in motion and signals are not being received from speed sensor 46. Since such circuitry and switching means may vary widely in their specific form to meet the purposes of the invention, those skilled in the art will readily understand from the description given what is required for purposes of the invention when applied to a specific kind of vehicle.

As mentioned above, the system 10 of the invention further incorporates a pair (left, right) of spring return, momentary contact, normally open, switches 32, 34 operated by contact arms 36 and 38 such that if the driver actuates the turn signal lever 25 for a turn, even though the lever 25 is already in the actuated position for that turn, the turn signal flasher 13 is reactivated by slight overtravel of lever 25 in the desired direction so as to cause the momentary closing of the particular switch 32 or 34 and restarting of the turn signal flashing cycle. The use of momentary contact switches thus permits the turn signal flashing cycle to be both reactivated and the timing circuitry restored to an "armed" condition after a period of time for receiving a subsequent activating signal.

Various modes of operation will next be explained. When the vehicle is stationary and no signal is being received from the speed sensor 46, the timing circuit of timer 12 is basically inoperative in that the timing circuit within timer 12 is bypassed thus permitting an untimed turn signal to be given by use of signal lever 25 and conventional switches 18, 20 such as when the driver of a stationary vehicle in a curbside parking space on the street desires to signal a desire to move into a street lane.

In another mode, when the vehicle is in motion and a signal from speed sensor 46 causes the referred to timing circuit to be placed in use, any right or left turn signal initiated by signal lever 25 and conventional switches 18, 20 will be timed and the corresponding left or right signal will be timed and the corresponding left or right signal will if not previously mechanically canceled be automatically and electronically cancelled after the expiration of such time.

In a final mode, it is assumed that after a turn signal has been given with the vehicle in motion, the timing cycle expires and the signal goes off, but the signal lever does not mechanically cancel and the driver desires to repeat the same kind of signal as last given. In this situation, the overtravel of lever 25, in the desired direction as indicated in FIG. 1, is used to activate the respective auxiliary switch 32 or 34 which causes a reactivation of the timing cycle and reactivation of the turn signal flasher 13.

In summary, again as referred to above, in the system 10 of the invention, the timing circuit of the timer 12 is tied in with the speed sensor 46 such that the timing circuit of timer 12 will not operate unless there is a signal from the speed sensor 46 to indicate the vehicle is moving. This provides additional safety and flexibility of the time interval for the timer 12. If the vehicle is stopped when the turn signal lever 25 is actuated, the timing cycle of timer 12 will not start. On the other hand, if the vehicle is in motion at the time the turn signal lever 25 is actuated, the timing circuit of timer 12 will start, but should the vehicle stop prior to the completion of the timing cycle, the timer 12 will be by-passed until such time as the vehicle is moving. Also to be remembered is that whenever a previously given turn signal is mechanically canceled, the timing circuit of the invention becomes inoperative until another turn signal is initiated by pivoting of lever 25.

Once the vehicle is in motion such that timer 12 can be actuated by a signal received from the speed sensor 46, the timing circuit energized by timer 12 is designed, in a first embodiment not shown but in a manner known to those skilled in the art of timers, to recycle in its entirety and in a second embodiment not shown but in a manner also known to those skilled in the art of timers, is designed to continue the timing cycle already in progress. Advantageously, the system 10 of the invention also does not interfere with and allows the hazard warning system of the vehicle to utilize the turn signal flashing system of the vehicle to indicate a disabled or stopped vehicle and can also be used to activate the hazard system continuously independent of the length of time of flashing.

For short term production solutions, the addition of a pair of inexpensive momentary contact switches (micro-switch) and related circuitry can be added to provide a path for the signal from the speed sensor. For long-term production economies the additional spring-loaded reactivating switches can be incorporated into existing turn signal actuation switches with minimum cost and function as either a primary system or as a redundant system.

In summary, it can be seen that unwarranted turn signal flashing on the highway can now be prevented by the system of the invention and particularly in the situation in which the normally expected mechanical cancellation does not take place.

What is claimed is:

1. An electrically self-canceling turn signal system for a vehicle, comprising:
    (a) a turn signal lever mounted accessible to the driver of the vehicle and being:
        (I) pivotable in one direction corresponding to a left turn to assume in sequence a first left turn switch position and after overtravel, a second left turn switch position; and
        (ii) pivotable in an opposite direction corresponding to a right turn to assume in sequence a first right turn switch position and after overtravel, a second right turn switch position;
    (b) a first pair of normally open, turn signal switches located respectively at said first left and right turn switch positions;
    (c) a second pair of normally open, momentary contact, turn signal switches located respectively at said second left and right turn switch positions;
    (d) closing means operatively associated with said lever for selectively closing each of said switches dependent upon the direction and extent of movement of said lever;
    (e) means for creating turn signals at each of said switches when closed by movement of said lever;
    (f) a sensor mounted for sensing motion of said vehicle and in the presence of such motion developing an electrical signal indicative of such motion;

(g) a turn signal flasher operable to generate a respective left or right turn flash signal in response to receiving a corresponding turn signal from any of said switches; and (h) a timing circuit interposed between said turn signal flasher and said switches and having both inactive and active states, said active state being dependent on signals received from said sensor and in said active state said timing circuit serves to route a turn signal received from any of said switches through said timing circuitry to said turn signal flasher for some predetermined time, and after expiration of said predetermined time for a particular turn, with said signal indicative of motion still being present, and the lever being already in the actuated first switch position for that left or right turn, the turn signal flasher being reactivated for another of said predetermined time by the momentary closing of the second turn switch position by overtravel movement of the lever in the direction for that turn, and in said inactive state said timing circuit serves to bypass a turn signal received from any of said switches around said timing circuitry and to said turn signal flasher.

2. An electrically self-canceling turn signal system for a vehicle as claimed in claim 1 including a mechanically self-canceling signal mechanism operative independent of said timing circuit whenever said vehicle is not in motion.

3. An electrically self-canceling turn signal system for a vehicle, comprising:

(a) a turn signal lever mounted accessible to the driver of the vehicle and being:
  (I) pivotable in one direction corresponding to a left turn to assume a first left turn switch position; and
  (ii) pivotable in an opposite direction corresponding to a right turn to assume a right turn switch position; and
  (iii) pivotable in either direction, after overtravel of the lever, to positions past said respective first left and right turn switch positions;

(b) a pair of normally open, momentary contact, turn signal switches located respectively at said left and right turn switch positions;

(c) closing means operatively associated with said lever for selectively closing each of said switches dependent upon the direction and extent of movement of said lever;

(d) means for creating turn signals at each of said switches when closed by movement of said lever;

(e) a sensor mounted for sensing motion of said vehicle and in the presence of such motion developing an electrical signal indicative of such motion;

(f) a turn signal flasher operable to generate a respective left or right turn flash signal in response to receiving a corresponding turn signal from either of said switches; and (g) a timing circuit interposed between said turn signal flasher and said switches and having both inactive and active states, said active state being dependent on signal received from said sensor through switching means connected with said timing circuit and in which active state said timing circuit serves to route a turn signal received from any of said switches through said timing circuitry to said turn signal flasher for some predetermined time, and after expiration of said predetermined time for a particular turn, with said signal indicative of motion still being present, and the lever being already in the actuated first switch position for that left or right turn, the turn signal flasher being reactivated for another of said predetermined time by the momentary overtravel of the lever to the position past said first switch position in the direction for that turn, and in said inactive state said timing circuit in connection with said switching means serves to bypass a turn signal received from any of said switches around said timing circuitry and to said turn signal flasher.

4. An electrically self-canceling turn signal system for a vehicle as claimed in claim 3 including a mechanically self-canceling signal mechanism operative independent of said timing circuit whenever said vehicle is not in motion.

5. An electrically self canceling turn signal system for a vehicle, comprising:

(a) a pair of normally open, momentary contact, turn signal switches located respectively on said vehicle at switch positions corresponding to giving of left and right turns signal;

(b) driver actuated closing means connected with said switches for selectively closing a selected one of said switches dependent upon the driver's desire to signal a respective left or right turn;

(c) means for creating respective left or right turn signals at each of said switches when closed by action of the driver of said vehicle;

(d) a sensor mounted for sensing motion of said vehicle and in the presence of such motion developing an electrical signal indicative of such motion;

(e) a turn signal flasher operable to generate a respective left or right turn flash signal in response to receiving a corresponding turn signal from either of said switches; and (f) a timing circuit interposed between said turn signal flasher and said switches and having both inactive and active states, said active state being dependent on signals received from said sensor through switching means connected with said timing circuit and in said active state said timing circuit serves to route a turn signal received from any of said switches through said timing circuitry to said turn signal flasher for some predetermined time, and after expiration of said predetermined time, with said signal indicative of motion still being present and with the driver actuated closing means already being placed in a switch position corresponding to a left or right turn signal, as desired by the driver, movement of the closing means being extended by overtravel of the closing means in the direction for that turn, thereby causing said turn signal flasher to be reactivated for another of said predetermined time, and in said inactive state said timing circuit in connection with said switching means serves to bypass a turn signal received from any of said switches around said timing circuitry and to said turn signal flasher.

* * * * *